(12) United States Patent
Woolward et al.

(10) Patent No.: US 9,973,472 B2
(45) Date of Patent: May 15, 2018

(54) METHODS AND SYSTEMS FOR ORCHESTRATING PHYSICAL AND VIRTUAL SWITCHES TO ENFORCE SECURITY BOUNDARIES

(71) Applicant: vArmour Networks, Inc., Mountain View, CA (US)

(72) Inventors: Marc Woolward, Bude (GB); Choung-Yaw Shieh, Palo Alto, CA (US)

(73) Assignee: vArmour Networks, Inc., Mountain View, CA (US)

( * ) Notice: Subject to any disclaimer, the term of this patent is extended or adjusted under 35 U.S.C. 154(b) by 92 days.

(21) Appl. No.: 14/677,827

(22) Filed: Apr. 2, 2015

(65) Prior Publication Data

US 2016/0294774 A1  Oct. 6, 2016

(51) Int. Cl.
  H04L 29/06 (2006.01)
(52) U.S. Cl.
  CPC ...... H04L 63/0236 (2013.01); H04L 63/0263 (2013.01); H04L 63/1491 (2013.01); H04L 63/20 (2013.01)
(58) Field of Classification Search
  CPC .................... H04L 63/0236; H04L 63/1491
  USPC .......................................................... 726/1
  See application file for complete search history.

(56) References Cited

U.S. PATENT DOCUMENTS

| 6,253,321 | B1 | 6/2001 | Nikander et al. |
| 6,484,261 | B1 | 11/2002 | Wiegel |
| 6,578,076 | B1 * | 6/2003 | Putzolu .......................... 709/223 |
| 6,765,864 | B1 | 7/2004 | Natarajan et al. |
| 6,970,459 | B1 | 11/2005 | Meier |
| 6,983,325 | B1 | 1/2006 | Watson et al. |
| 6,992,985 | B1 | 1/2006 | Das |

(Continued)

FOREIGN PATENT DOCUMENTS

| TW | 201642616 A | 12/2016 |
| TW | 201642617 A | 12/2016 |

(Continued)

OTHER PUBLICATIONS

Non-Final Office Action, dated Jul. 1, 2015, U.S. Appl. No. 14/673,640, filed Mar. 30, 2015.

(Continued)

*Primary Examiner* — Oleg Korsak
(74) *Attorney, Agent, or Firm* — Carr & Ferrell LLP

(57) ABSTRACT

Some embodiments include methods comprising: writing entries in a forwarding table of a switch through an application programming interface (API) of the switch, such that first data packets from a first host and directed to a second host are forwarded by the switch to an enforcement point; receiving the first data packets; forwarding the first data packets to the enforcement point using the forwarding table; determining whether the first data packets violate a high-level security policy using a low-level rule set; configuring the forwarding table through the API such that second data packets are forwarded by the switch to the second host, in response to determining the first data packets do not violate the security policy; configuring the forwarding table through the API such that the second data packets are dropped or forwarded to a security function by the switch, in response to the determining.

7 Claims, 4 Drawing Sheets

(56) References Cited

U.S. PATENT DOCUMENTS

| | | |
|---|---|---|
| 7,028,179 B2 | 4/2006 | Anderson et al. |
| 7,058,712 B1 | 6/2006 | Vasko et al. |
| 7,062,566 B2 | 6/2006 | Amara et al. |
| 7,068,598 B1 | 6/2006 | Bryson et al. |
| 7,373,524 B2 | 5/2008 | Motsinger et al. |
| 7,397,794 B1 * | 7/2008 | Lacroute et al. ............ 370/367 |
| 7,464,407 B2 | 12/2008 | Nakae et al. |
| 7,519,062 B1 | 4/2009 | Kloth et al. |
| 7,542,455 B2 | 6/2009 | Grayson et al. |
| 7,620,986 B1 | 11/2009 | Jagannathan et al. |
| 7,694,181 B2 | 4/2010 | Noller et al. |
| 7,742,414 B1 | 6/2010 | Iannaccone et al. |
| 7,774,837 B2 | 8/2010 | McAlister |
| 7,849,495 B1 | 12/2010 | Huang et al. |
| 7,900,240 B2 | 3/2011 | Terzis et al. |
| 7,904,454 B2 | 3/2011 | Raab |
| 7,949,677 B2 | 5/2011 | Croft et al. |
| 7,954,150 B2 | 5/2011 | Croft et al. |
| 7,986,938 B1 | 7/2011 | Meenan et al. |
| 7,996,255 B1 | 8/2011 | Shenoy et al. |
| 8,051,460 B2 * | 11/2011 | Lum et al. .................... 726/1 |
| 8,112,304 B2 | 2/2012 | Scates |
| 8,259,571 B1 | 9/2012 | Raphel et al. |
| 8,274,912 B2 | 9/2012 | Wray et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,490,153 B2 | 7/2013 | Bassett et al. |
| 8,494,000 B1 | 7/2013 | Nadkarni et al. |
| 8,565,118 B2 | 10/2013 | Shukla et al. |
| 8,612,744 B2 | 12/2013 | Shieh |
| 8,661,434 B1 | 2/2014 | Liang et al. |
| 8,688,491 B1 | 4/2014 | Shenoy et al. |
| 8,726,343 B1 | 5/2014 | Borzycki et al. |
| 8,798,055 B1 | 8/2014 | An |
| 8,813,169 B2 | 8/2014 | Shieh et al. |
| 8,813,236 B1 | 8/2014 | Saha et al. |
| 8,935,457 B2 | 1/2015 | Feng et al. |
| 8,938,782 B2 | 1/2015 | Sawhney et al. |
| 8,955,093 B2 | 2/2015 | Shieh et al. |
| 8,984,114 B2 | 3/2015 | Shieh et al. |
| 8,990,371 B2 | 3/2015 | Kalyanaraman et al. |
| 9,361,089 B2 | 6/2016 | Bradfield et al. |
| 9,380,027 B1 | 6/2016 | Lian et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 2002/0031103 A1 | 3/2002 | Wiedeman et al. |
| 2003/0014665 A1 | 1/2003 | Anderson et al. |
| 2003/0055950 A1 | 3/2003 | Cranor et al. |
| 2003/0123481 A1 | 7/2003 | Neale et al. |
| 2003/0135625 A1 | 7/2003 | Fontes et al. |
| 2003/0177389 A1 | 9/2003 | Albert et al. |
| 2003/0236985 A1 | 12/2003 | Ruuth |
| 2004/0062204 A1 | 4/2004 | Bearden et al. |
| 2004/0093513 A1 | 5/2004 | Cantrell et al. |
| 2004/0095897 A1 | 5/2004 | Vafaei |
| 2004/0172618 A1 | 9/2004 | Marvin |
| 2004/0214576 A1 | 10/2004 | Myers et al. |
| 2005/0021943 A1 | 1/2005 | Ikudome et al. |
| 2005/0033989 A1 | 2/2005 | Poletto et al. |
| 2005/0060573 A1 | 3/2005 | D'Souza |
| 2005/0114288 A1 | 5/2005 | Dettinger et al. |
| 2005/0114829 A1 | 5/2005 | Robin et al. |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0050696 A1 | 3/2006 | Shah et al. |
| 2006/0137009 A1 | 6/2006 | Chesla |
| 2006/0150250 A1 | 7/2006 | Lee et al. |
| 2006/0177063 A1 | 8/2006 | Conway et al. |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016550 A1 | 1/2008 | McAlister |
| 2008/0083011 A1 | 4/2008 | McAlister et al. |
| 2008/0086772 A1 | 4/2008 | Chesla |
| 2008/0155239 A1 | 6/2008 | Chowdhury et al. |
| 2008/0163207 A1 | 7/2008 | Reumann et al. |
| 2008/0222375 A1 | 9/2008 | Kotsovinos et al. |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0083445 A1 | 3/2009 | Ganga |
| 2009/0103524 A1 | 4/2009 | Mantripragada et al. |
| 2009/0138316 A1 | 5/2009 | Weller et al. |
| 2009/0165078 A1 | 6/2009 | Samudrala et al. |
| 2009/0182835 A1 | 7/2009 | Aviles et al. |
| 2009/0190585 A1 | 7/2009 | Allen et al. |
| 2009/0228966 A1 | 9/2009 | Parfene et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Bimbach |
| 2010/0095367 A1 | 4/2010 | Narayanaswamy |
| 2010/0100616 A1 | 4/2010 | Bryson et al. |
| 2010/0104094 A1 | 4/2010 | Takashima |
| 2010/0125900 A1 | 5/2010 | Dennerline et al. |
| 2010/0132031 A1 | 5/2010 | Zheng |
| 2010/0189110 A1 | 7/2010 | Kambhampati et al. |
| 2010/0191863 A1 | 7/2010 | Wing |
| 2010/0192225 A1 | 7/2010 | Ma et al. |
| 2010/0199349 A1 | 8/2010 | Ellis |
| 2010/0208699 A1 | 8/2010 | Lee et al. |
| 2010/0228962 A1 * | 9/2010 | Simon ................ H04L 63/0428 713/150 |
| 2010/0235880 A1 | 9/2010 | Chen et al. |
| 2010/0235902 A1 | 9/2010 | Guo et al. |
| 2010/0274970 A1 | 10/2010 | Treuhaft et al. |
| 2010/0281533 A1 | 11/2010 | Mao et al. |
| 2010/0281539 A1 | 11/2010 | Burns et al. |
| 2010/0333165 A1 | 12/2010 | Basak et al. |
| 2011/0003580 A1 | 1/2011 | Belrose et al. |
| 2011/0010515 A1 | 1/2011 | Ranade |
| 2011/0013776 A1 | 1/2011 | McAlister |
| 2011/0069710 A1 | 3/2011 | Naven et al. |
| 2011/0072486 A1 | 3/2011 | Hadar et al. |
| 2011/0075667 A1 | 3/2011 | Li et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 * | 10/2011 | Lin et al. ...................... 370/400 |
| 2011/0261722 A1 | 10/2011 | Awano |
| 2011/0263238 A1 | 10/2011 | Riley et al. |
| 2011/0299533 A1 | 12/2011 | Yu et al. |
| 2012/0017258 A1 | 1/2012 | Suzuki |
| 2012/0036567 A1 | 2/2012 | Senese et al. |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |

(56) References Cited

U.S. PATENT DOCUMENTS

| | | |
|---|---|---|
| 2012/0254980 A1 | 10/2012 | Takahashi |
| 2012/0287931 A1 | 11/2012 | Kidambi et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0081142 A1 | 3/2013 | McDougal et al. |
| 2013/0086383 A1 | 4/2013 | Galvao de Andrade et al. |
| 2013/0086399 A1 | 4/2013 | Tychon et al. |
| 2013/0097692 A1 | 4/2013 | Cooper et al. |
| 2013/0111542 A1 | 5/2013 | Shieh |
| 2013/0117836 A1 | 5/2013 | Shieh |
| 2013/0151680 A1 | 6/2013 | Salinas et al. |
| 2013/0152187 A1 | 6/2013 | Strebe et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0254871 A1 | 9/2013 | Sun et al. |
| 2013/0263245 A1 | 10/2013 | Sun et al. |
| 2013/0275592 A1 | 10/2013 | Xu et al. |
| 2013/0276092 A1 | 10/2013 | Sun et al. |
| 2013/0291088 A1 | 10/2013 | Shieh et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0298469 A1 | 10/2014 | Marion et al. |
| 2014/0310765 A1 | 10/2014 | Stuntebeck et al. |
| 2014/0344435 A1 | 11/2014 | Mortimore, Jr. et al. |
| 2015/0047046 A1 | 2/2015 | Pavlyushchik |
| 2015/0124606 A1 | 5/2015 | Alvarez et al. |
| 2015/0163088 A1 | 6/2015 | Anschutz |
| 2015/0186296 A1 | 7/2015 | Guidry |
| 2015/0229641 A1 | 8/2015 | Sun et al. |
| 2015/0229656 A1 | 8/2015 | Shieh |
| 2015/0249676 A1 | 9/2015 | Koyanagi et al. |
| 2015/0269383 A1 | 9/2015 | Lang et al. |
| 2016/0191545 A1 | 6/2016 | Nanda et al. |
| 2016/0203331 A1 | 7/2016 | Khan et al. |
| 2016/0269442 A1 | 9/2016 | Shieh |
| 2016/0294875 A1 | 10/2016 | Lian et al. |
| 2016/0323245 A1 | 11/2016 | Shieh et al. |
| 2017/0063795 A1 | 3/2017 | Lian et al. |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0374032 A1 | 12/2017 | Woolward et al. |
| 2017/0374101 A1 | 12/2017 | Woolward |
| 2018/0005296 A1 | 1/2018 | Eades et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 | 12/2002 |
| WO | WO2011012165 | 2/2011 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

Non-Final Office Action, dated Jul. 7, 2015, U.S. Appl. No. 14/673,679, filed Mar. 30, 2015.
Non-Final Office Action, dated Jul. 31, 2015, U.S. Appl. No. 14/677,755, filed Apr. 2, 2015.
Specification, U.S. Appl. No. 14/673,679, filed Mar. 30, 2015.
Specification, U.S. Appl. No. 14/673,640, filed Mar. 30, 2015.
Specification, U.S. Appl. No. 14/657,282, filed Mar. 13, 2015.
Specification, U.S. Appl. No. 14/839,649, filed Aug. 28, 2015.
Specification, U.S. Appl. No. 14/839,699, filed Aug. 28, 2015.
Specification, U.S. Appl. No. 14/657,210, filed Mar. 13, 2015.
International Search Report dated May 3, 2016 in Patent Cooperation Treaty Application No. PCT/US2016/024300, filed Mar. 25, 2016.
International Search Report dated May 3, 2016 in Patent Cooperation Treaty Application No. PCT/US2016/024053 filed Mar. 24, 2016.
International Search Report dated May 6, 2016 in Patent Cooperation Treaty Application No. PCT/US2016/019643 filed Feb. 25, 2016.
Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection.
International Search Report dated Jun. 20, 2016 in Patent Cooperation Treaty Application No. PCT/US2016/024310 filed Mar. 25, 2016, pp. 1-9.
International Search Report dated May 3, 2016 in Patent Cooperation Treaty Application No. PCT/US2016/024116 filed Mar. 24, 2016.
"Feature Handbook: NetBrain® Enterprise Edition 6.1" NetBrain Technologies, Inc., Feb. 25, 2016, 48 pages.
Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.
"International Search Report" and "Written Opinion of the International Searching Authority," Patent Cooperation Treaty Application No. PCT/US2016/065451, dated Jan. 12, 2017, 20 pages.
Maniar, Neeta, "Centralized Tracking and Risk Analysis of 3rd Party Firewall Connections," SANS Institute InfoSec Reading Room, Mar. 11, 2005, 20 pages.
Hu, Hongxin et al., "Detecting and Resolving Firewall Policy Anomalies," IEEE Transactions on Dependable and Secure Computing, vol. 9, No. 3, May/Jun. 2012, pp. 318-331.

* cited by examiner

METHODS AND SYSTEMS FOR ORCHESTRATING PHYSICAL AND VIRTUAL SWITCHES TO ENFORCE SECURITY BOUNDARIES

FIELD OF THE INVENTION

The present technology is generally directed to computer security, and more specifically, but not by way of limitation, to computer network security.

SUMMARY

Some embodiments include methods comprising: writing, by a policy engine, entries in a forwarding table of a switch through an application programming interface (API) of the switch, such that first data packets from a first host and directed to a second host are forwarded by the switch to an enforcement point; receiving, by the switch, the first data packets; forwarding, by the switch, the first data packets to the enforcement point using the forwarding table; determining, by the enforcement point, whether the first data packets violate a high-level security policy using a low-level rule set; configuring, by the enforcement point, the forwarding table through the API such that second data packets are forwarded by the switch to the second host, in response to determining the first data packets do not violate the security policy; configuring, by the enforcement point, the forwarding table through the API such that the second data packets are dropped or forwarded to a security function by the switch, in response to determining the first data packets violate the security policy; receiving, by the switch, second data packets; and selectively dropping or forwarding the second data packets, by the switch, in accordance with the configuration.

Various embodiments include systems comprising: a data network; a plurality of hosts communicatively coupled to the data network; a switch communicatively coupled to the data network, including a forwarding table and an application programming interface (API); an enforcement point communicatively coupled to the data network; and a policy engine communicatively coupled to the data network, wherein the system performs a method comprising: writing, by the policy engine, entries in the forwarding table of the switch through the application programming interface (API), such that first data packets from a first host and directed to a second host are forwarded by the switch to the enforcement point; receiving, by the switch, the first data packets; forwarding, by the switch, the first data packets to the enforcement point using the forwarding table; determining, by the enforcement point, whether the first data packets violate a high-level security policy using a low-level rule set; configuring, by the enforcement point, the forwarding table through the API such that second data packets are forwarded by the switch to the second host, in response to determining the first data packets do not violate the security policy; configuring, by the enforcement point, the forwarding table through the API such that the second data packets are dropped or forwarded to a security function by the switch, in response to determining the first data packets violate the security policy; receiving, by the switch, second data packets; and selectively dropping or forwarding the second data packets, by the switch, in accordance with the configuration.

DETAILED DESCRIPTION

An exemplary system according to the present technology operates when new connections are being made, by pushing the decision regarding the connection to a higher level for inspection, and evaluating the new connections for allowance. These new connections are implemented by the switch in each server/rack. A switch has a forwarding table, which implements a rule. In an exemplary system, all initial traffic between nodes that have not communicated before is to not communicate without first forwarding to distributed security processor. This is the default rule and provides the basic level of security, since the distributed security processor has to approve all connections.

An exemplary system may use an enforcement point (EP) operating in the switch or associated with the switch, which sends communications to the distributed security processor. This communication may be via a tunneling system, for example, a Virtual Extensible Local Area Network (VX-LAN). The distributed security processor checks the policy, validates expected protocol behavior, and after approving the communication, forwards the first several packets to the intended recipient node. Next, the distributed security processor programs the switch to allow future communications from the first port to the second port (also referred to or alternatively may be: a node, a communication node, a virtual machine, a container, and a host). Additionally, the sender and recipient in this and all other examples may be on the same server controlled by the same switch, different servers controlled by the same switch, or may be on different servers controlled by different switches.

In an exemplary system according to the present technology, the initial forwarding table includes a default routing rule to first send all communications to the distributed security processor, which is later rewritten to allow communications directly controlled by the switch without intervention by the distributed security processor. Certain information in a packet header will prompt a re-forwarding to the distributed security processor. For example, if a Transmission Control Protocol (TCP) header includes information relating to setting up and/or tearing down a connection, then the distributed security processor is consulted to review the communication, and distributed security processor approval is required. For example, a TCP header including SYN, FIN, and/or RST, relating to the setting up or tearing down of connections, might require the distributed security processor approval. Actions of the distributed security processor may be logged to allow review and enforcement, as well as policy revision.

Figure 1:
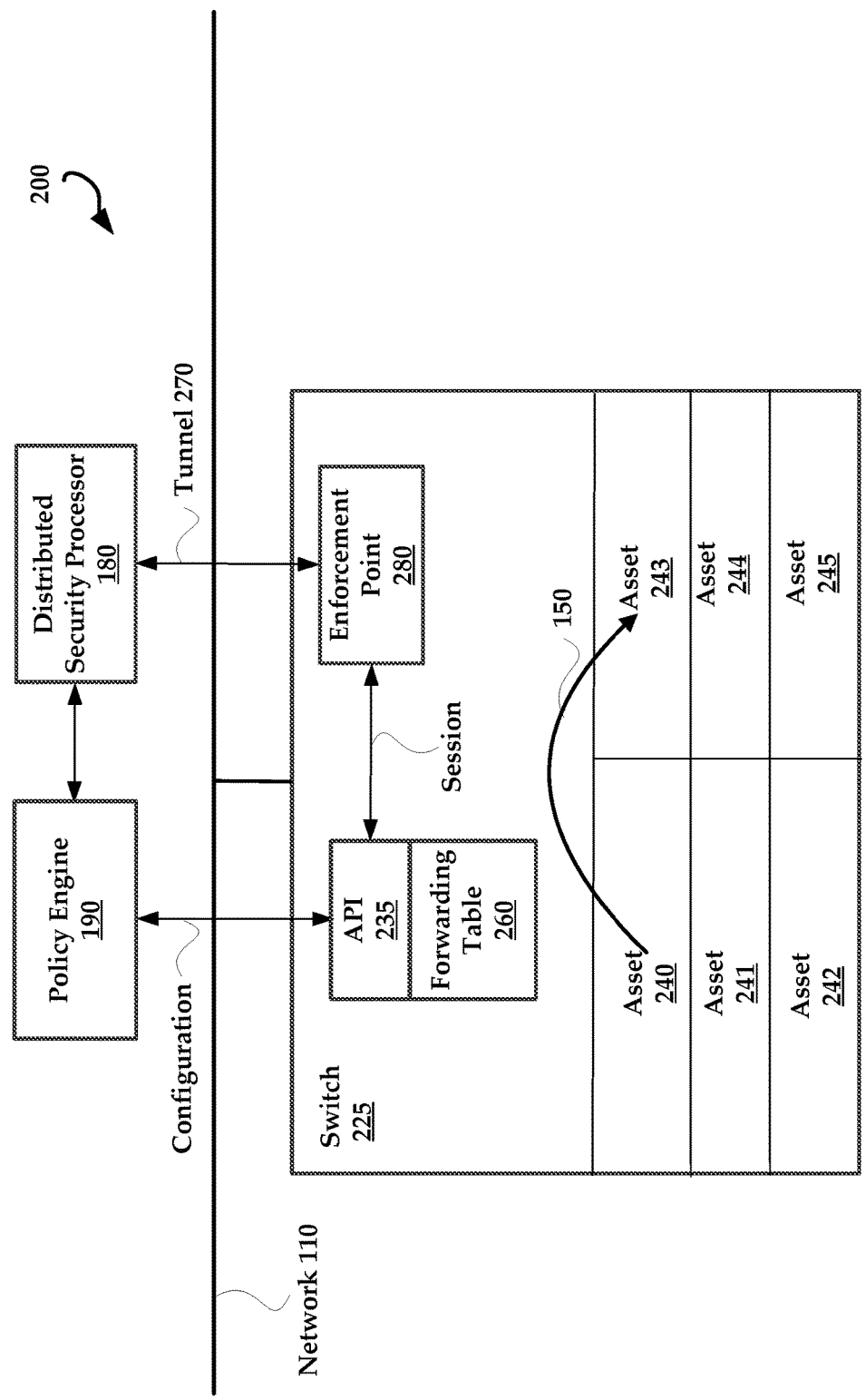
FIG. 1 is a simplified block diagram illustrating a system according to some embodiments.

FIG. 1 is a block diagram illustrating system 100 according to an example embodiment. System 100 may be a cloud server environment, which may be a public cloud, private cloud, an intranet, or any other appropriate network. System 100 includes a policy engine 190, which may enable an Information Technology (IT) or security administrator to implement security policies in system 100. These policies may include, for example, prohibitions against high value assets from communicating with high risk assets, or production machines from communicating with test/development machines. These policies may also include failover policies, or any other appropriate prohibition, limitation or policy.

Policy engine 190 may communicate bilaterally with distributed security processor 180, which may operate to implement the policies. Additionally, policy engine 190 may communicate bilaterally with switch 125 via Application Programming Interface (API) 135 associated with switch 125 to implement the policies. API 135 includes a set of routines, protocols, and/or tools for building software applications for switch 125. API 135 may express a software component in terms of its operations, inputs, outputs, and underlying types. Alternatively or additionally, API 135 may be a software development kit (SDK or "devkit"), which includes a set of software development tools that allows the creation of applications for switch 125. Distributed security processor 180 may communicate computer executable instructions to API 135. System 100 may include many assets 140-145, with a similar or different structure from each other. Each of assets 140-145 may be coupled to some or all of the other of assets 140-145 in system 100 via network 110. At least some of assets 140-145 may also be coupled via network 110 to the internet, an intranet, or any other appropriate network.

In some embodiments, assets 140-145 are at least one of a virtual machine (VM), physical host, workload, server, cloud-based virtual machine, client, enforcement target, and the like. Each of assets 140-145 is communicatively coupled with switch 125, which may operate to control communications into and out of assets 140-145, and between assets 140-145. For example, one or more of assets 140-145 include a VM (e.g. asset 143 may is referenced as VM 143). The virtual machines may operate as part of a hypervisor. Alternatively, different virtual machine systems may be used, for example, containers.

In operation, policy engine 190 communicates with API 135, to program forwarding table 160 of switch 125. The initial programming is the default programming, and indicates to forward any communication which has not previously been approved by distributed security processor 180 (which is all communications in the initial default situation) to distributed security processor 180. Next, asset 140 may attempt to communicate, by communication 150, to virtual machine (VM) 143. Switch 125 checks forwarding table 160 prior to allowing the communication, and since no approval indication exists there, switch 125 forwards the packets to distributed security processor 180 via tunnel 170. Tunnel 170 may be through a fabric of the data center of system 100, and may be a VXLAN communication path.

In some embodiments, policy engine 190 communicates with API 135, to program forwarding table 160 of switch 125. The initial programming is the default programming, and indicates to forward communication requiring processing by distributed security processor 180 (which is all communications in the initial default situation) to distributed security processor 180. Next, asset 140 may attempt to communicate, by communication 150, to virtual machine (VM) 143 using a protocol defined within the security policy applied to switch 125. Switch 125 checks forwarding table 160 prior to allowing the communication, and since no approval indication exists there, switch 125 forwards the packets to distributed security processor 180 via tunnel 170. Tunnel 170 may be through a fabric of the data center of system 100, and may be a VXLAN communication path. In this manner, it is possible for an administrator to 'tune' the traffic types requiring security processing within the network.

In various embodiments, the next step is for distributed security processor 180 to perform security checks on the communication and the sender and recipient nodes against policy provided by policy engine 190. The following step is, if the connection is approved, to forward the communication to VM 143, and to program a forwarding entry in forwarding table 160 of switch 125 for communications between asset 140 and asset 143. In this manner, subsequent communications between asset 140 and asset 143 may be handled by switch 125 without the assistance of distributed security processor 180, thereby optimizing communication and reducing resource load. However, some trigger events will cause the forwarding table to revert to a default position for a particular routing instruction, or for all routing instructions. The trigger event is also referred to herein as a condition, and may relate to a packet header, and/or changing of a connection between nodes.

If distributed security processor 180 performs a security check on the initial communication and the sender and recipient nodes against policy, and determines that the communication is prohibited or suspect in any manner, distributed security processor 180 may redirect the communication to a honeypot, redirect the communication to a tarpit, drop the packets, and may forward the packets without writing to forwarding table 160, so that future packets are also routed to distributed security processor 180, thereby providing inspection, logging, and security information to an IT administrator or security expert.

Figure 2:
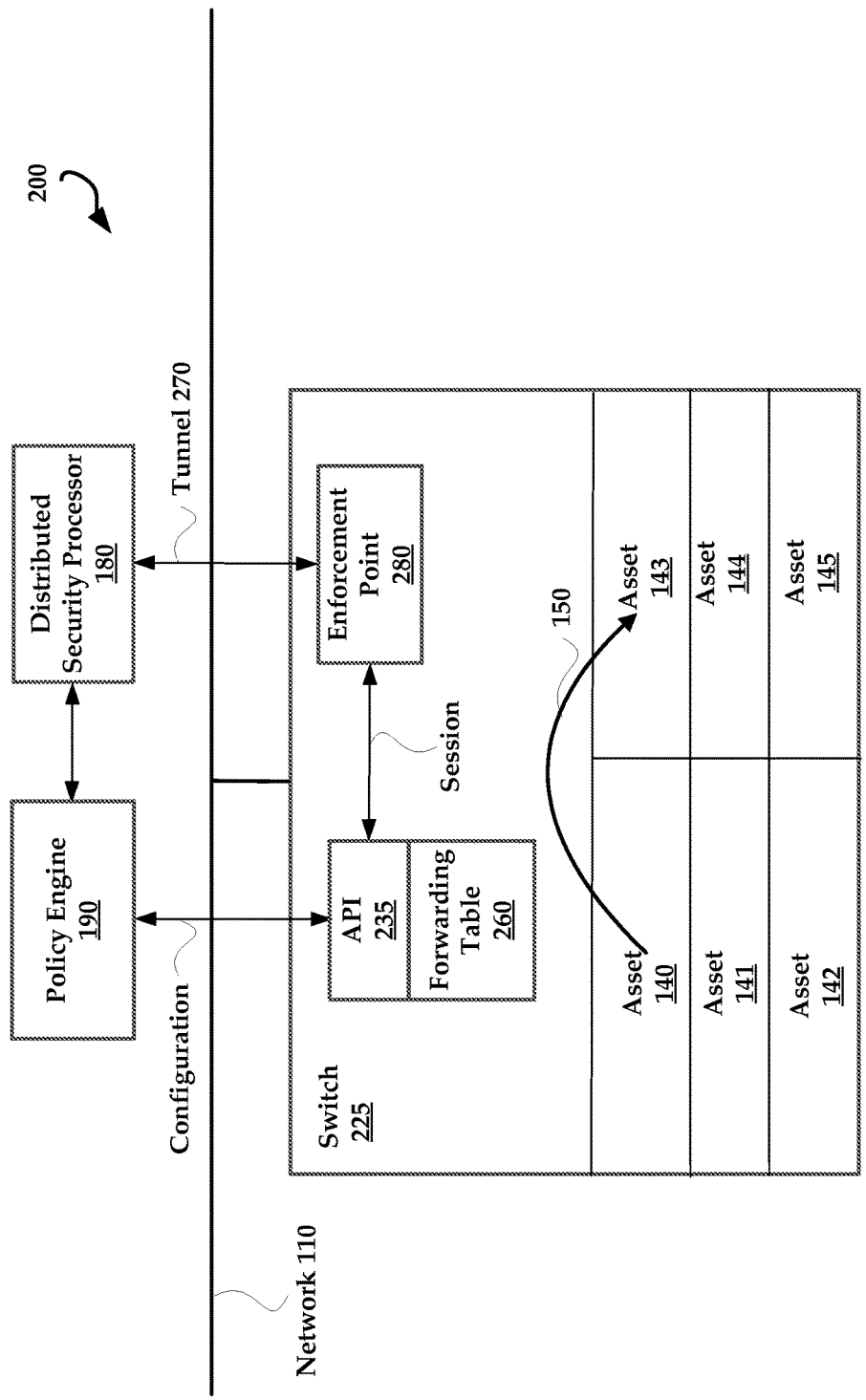
FIG. 2 is a simplified block diagram illustrating another system in accordance with some embodiments.

In an exemplary embodiment illustrated in FIG. 2, a physical programmable switch—for example, a merchant silicon (or custom ASIC) networking switch—for low-level packet forwarding, may be utilized. In this exemplary embodiment, the forwarding table is initially blank, and as in the previously described exemplary embodiment illustrated in FIG. 1, the nodes do not need to be on the same switch.

FIG. 2 is a block diagram illustrating system 200 according to an example embodiment. System 200 may be a cloud server environment, which may be a public cloud, private cloud, an intranet, or any other appropriate network. System 200 includes policy engine 190, which may enable an IT or security administrator to implement security policies in system 200. Policy engine 190 may communicate bilaterally with distributed security processor 180, which may operate to implement the policies. Additionally, policy engine 190 may communicate bilaterally with a switch 225.

Distributed security processor 180 may communicate computer executable instructions to API 235. System 200 may include assets 240-245, with a similar or different structure from each other. At least some of assets 240-245 may be coupled to some or all of the other of assets 240-245 in system 200 via network 110. At least some of assets 240-245 may also be coupled via network 110 to the internet, an intranet, or any other appropriate network.

Each of assets 240-245 is communicatively coupled to switch 225, which may operate to control communications into and out of assets 240-245, and between assets 240-245. At least some of assets 240-245 may include one or more virtual machines. The virtual machines may operate as part of a hypervisor. Alternatively, different virtual machine systems may be used, for example containers. Additionally, at least one of assets 240-245 may include honeypot and/or tarpit virtual machines. A honeypot and a tarpit may operate as described above and herein.

Switch 225 may include Application Programming Interface (API) 235 to implement the policies by programming forwarding table 260. API 235 includes a set of routines, protocols, and/or tools for building software applications for switch 225. API 235 may express a software component in terms of its operations, inputs, outputs, and underlying types. Alternatively or additionally, API 235 may be a software development kit (SDK or "devkit"), which includes a set of software development tools that allows the creation of applications for switch 225. Switch 225 may also include enforcement point 280, which communicates bilaterally through the fabric of system 200 with distributed security processor 180.

In operation, policy engine 190 communicates to switch 225, to program forwarding table 260 of switch 225. The initial programming is the default programming, and indicates to forward any communication which has not previously been approved by distributed security processor 180 (which is all communications in the initial default situation) to distributed security processor 180. Next, asset 240 may attempt to communicate, by communication 150, to asset 243. Switch 225 checks forwarding table 260 prior to allowing the communication, and since no approval indication exists there, switch 225 forwards the packets to enforcement point 280 via a tunnel 270. Enforcement point 280 also exists virtually on switch 225.

In various embodiments, the next step is for enforcement point 280 to perform first security checks on the communication and the sender and recipient nodes against policy provided by distributed security processor 180 and policy engine 190. The following step is, if the connection is approved, to forward the communication to asset 243, and program via API 235 a forwarding entry in forwarding table 260 of switch 225 for communications between asset 243 and asset 243. In this manner, subsequent communications between asset 240 and asset 243 may be handled by switch 225 without the assistance of enforcement point 280, thereby optimizing communication and reducing resource load. However, some trigger events will cause the forwarding table to revert to a default position for a particular routing instruction, or for all routing instructions. The trigger event is also referred to herein as a condition, and may relate to a packet header, and/or changing of a connection between nodes.

If enforcement point 280 performs security checks on the initial communication and the sender and recipient nodes against policy and determines that the communication is prohibited or suspect in any manner, or even if the decision requires additional resources or a second level of security, enforcement point 280 may redirect the communication to distributed security processor 180 over the tunnel 270 for a further determination on the acceptability of the communication between asset 240 and asset 243.

Distributed security processor 180 performs these second, higher level security checks on the communication and the sender and recipient nodes against policy provided by policy engine 190. Additionally, distributed security processor 180 may check the communication to ensure that protocol sessions are set up according to documented standards. This advantageously reduces the aperture for protocol attacks and ensures protocol relationships (e.g., above TCP such as between OSI layers 5-7) are established correctly. If distributed security processor 180 performs security checks on the initial communication and the sender and recipient nodes against policy and determines if the communication is prohibited or suspect in any manner, then distributed security processor 180 may redirect the communication to a honeypot, redirect the communication to a tarpit, may drop the packets, may forward the packets without writing to forwarding table 260, so that future packets are also routed to distributed security processor 180, thereby providing inspection, logging, and security information to an IT administrator or security expert.

If distributed security processor 180 performs these second, higher level security checks on the communication and the sender and recipient nodes and approves the connection, then distributed security processor 180 may forward the communication to asset 243, either directly, or by instructing enforcement point 280 to forward the communication to asset 243. Additionally, distributed security processor 180 may direct enforcement point 280 to program, via API 235, the forwarding entry in forwarding table 260 of switch 225 for communications between asset 240 and asset 243. In this manner, subsequent communications between asset 240 and asset 243 may be handled by switch 225 without the assistance of enforcement point 280, thereby optimizing communication and reducing resource load. In still another alternative, distributed security processor 180 may authorize enforcement point 280 to handle communications of this type for new, future connections, or even to not program forwarding table 260 for this connection, so that new, future communications are monitored at an intermediate level of security.

As discussed previously, some trigger events will cause the forwarding table to revert to a default position for a particular routing instruction, or for all routing instructions. The trigger event is also referred to herein as a condition, and may relate to a packet header, and/or changing of a connection between nodes.

In exemplary embodiments of the present technology, the initiation of communications between nodes is an event requiring higher scrutiny, and this policy is implemented by having the default forwarding table include no entry. The communication is forwarded to an EP directly, to an EPI directly, or to an EP via an EPI, across a tunnel or a fabric of a network. The EP and/or EPI checks policy, and may determine to allow the communication, in which case an EPI may be programmed, and the forwarding table is updated to enable the communication between the nodes. This policy is applied to future communications, unless a trigger condition is met. A distinction between the model of system 100 (FIG. 1) and the model of system 200 (FIG. 2) is that small changes, for example, flag changes, may be handled by an EPI without involving the EP, thus improving efficiency. In all cases, logging may be sent across the fabric to the EP and/or the policy engine, and/or another user interface or reporting module.

The switches described above, including switch 125 and switch 225, may be in the physical environment. In alternative exemplary embodiments, the switch may be a virtual switch.

Various exemplary embodiments of the present invention may enable the management of table resources on a switch for optimization. For example, if a switch is running out of free space, then connections can be aggregated in the forwarding table, or connections may be pushed to other resources for confirmation.

In some embodiments, switch 225 is a hardware switch and at least one of assets 240-245 is a physical host. In various embodiments, switch 225 is a virtual switch and at least one of assets 240-245 is a virtual machine.

Figure 3:
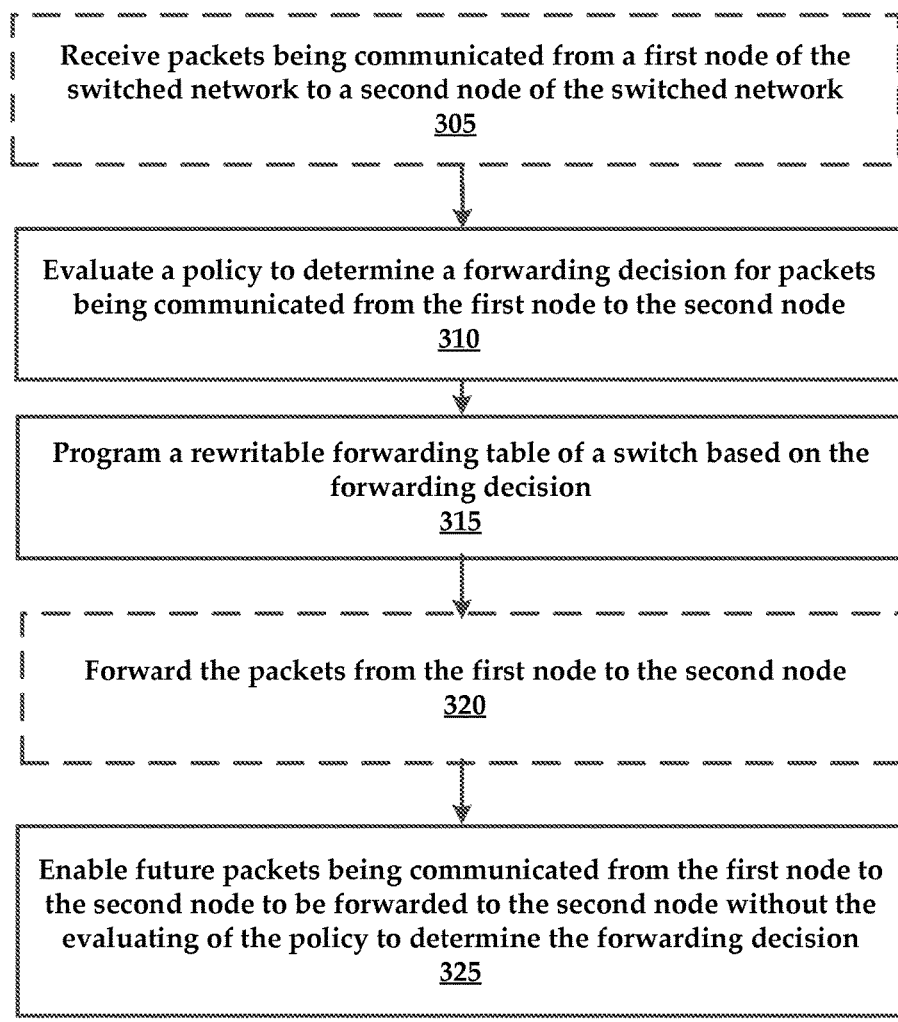
FIG. 3 is a simplified flowchart of an example method of the present technology according to various embodiments.

FIG. 3 is a flowchart of an example method 300 for enforcing security policies for communicating between nodes of a switched network. Optional steps are shown with dashed lines. The method 300 of FIG. 3 includes optional operation 305, which indicates to receive packets being communicated from a first node of the switched network to a second node of the switched network. From optional operation 305, the method proceeds to operation 310, which indicates to evaluate a policy to determine a forwarding decision for packets being communicated from the first node to the second node. From operation 310, the method proceeds to operation 315, which indicates to program a rewritable forwarding table of a switch based on the forwarding decision. From operation 315, the method proceeds to optional operation 320, which indicates to forward the packets from the first node to the second node. This step is optional since the prior non-optional steps 310 and 315 may be initiated at a start-up or other appropriate time, for instance a policy update, without the communication of packets. From optional operation 320, the method proceeds to operation 325, which indicates to enable future packets being communicated from the first node to the second node to be forwarded to the second node without the evaluating of the policy to determine the forwarding decision. In still further variations of the method, the policy may prohibit the communication being sought between the first and second nodes, in which case the communication may be dropped, logged, honey-potted, tarpitted, or all of the above.

Figure 4:
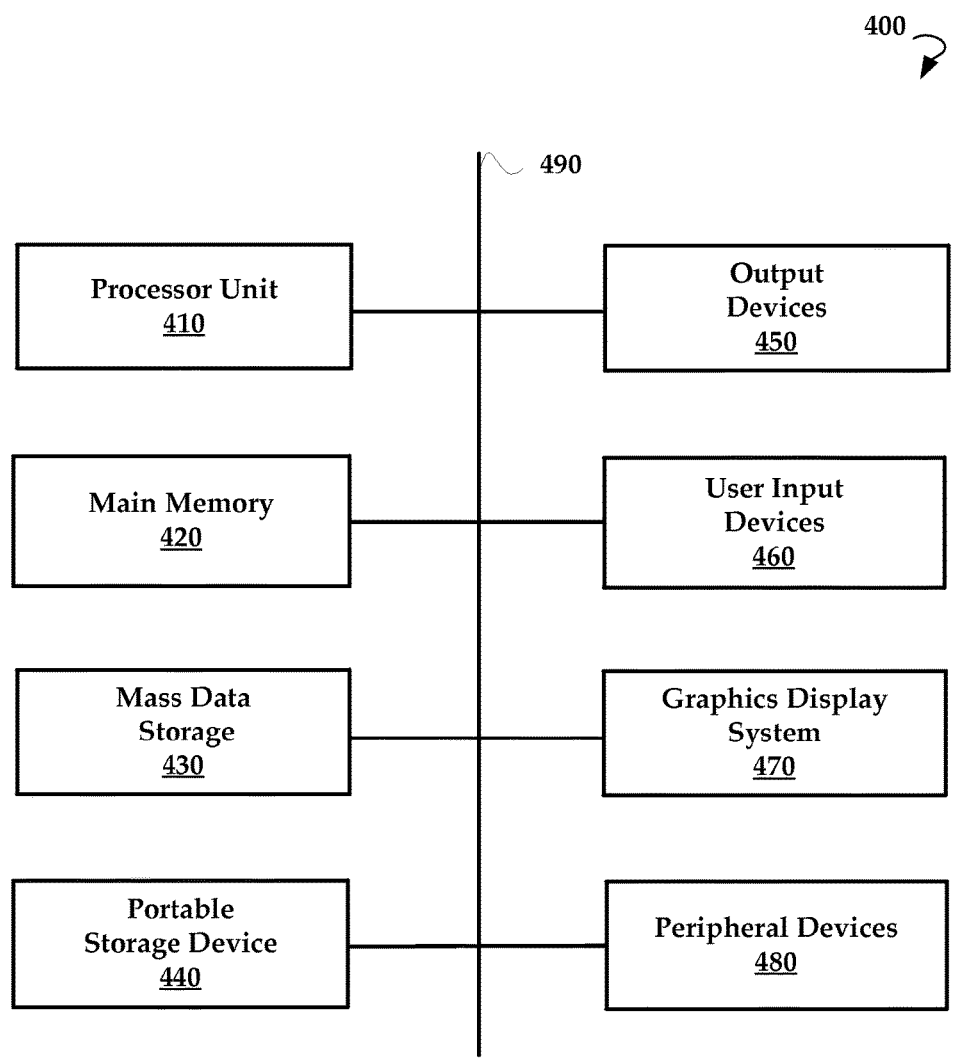
FIG. 4 illustrates an example computer system in accordance with various embodiments.
Figure 1:
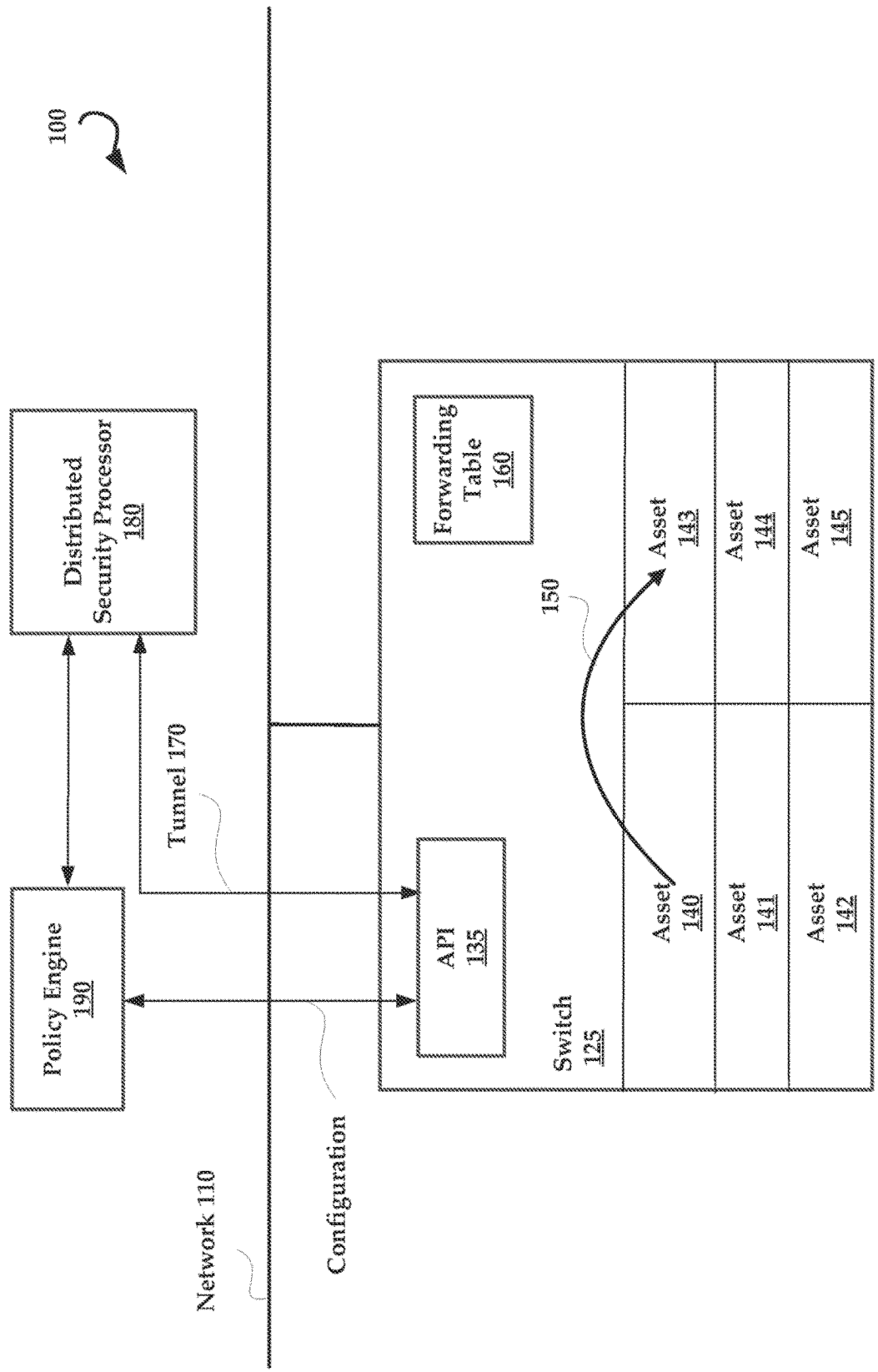
Figure 2:
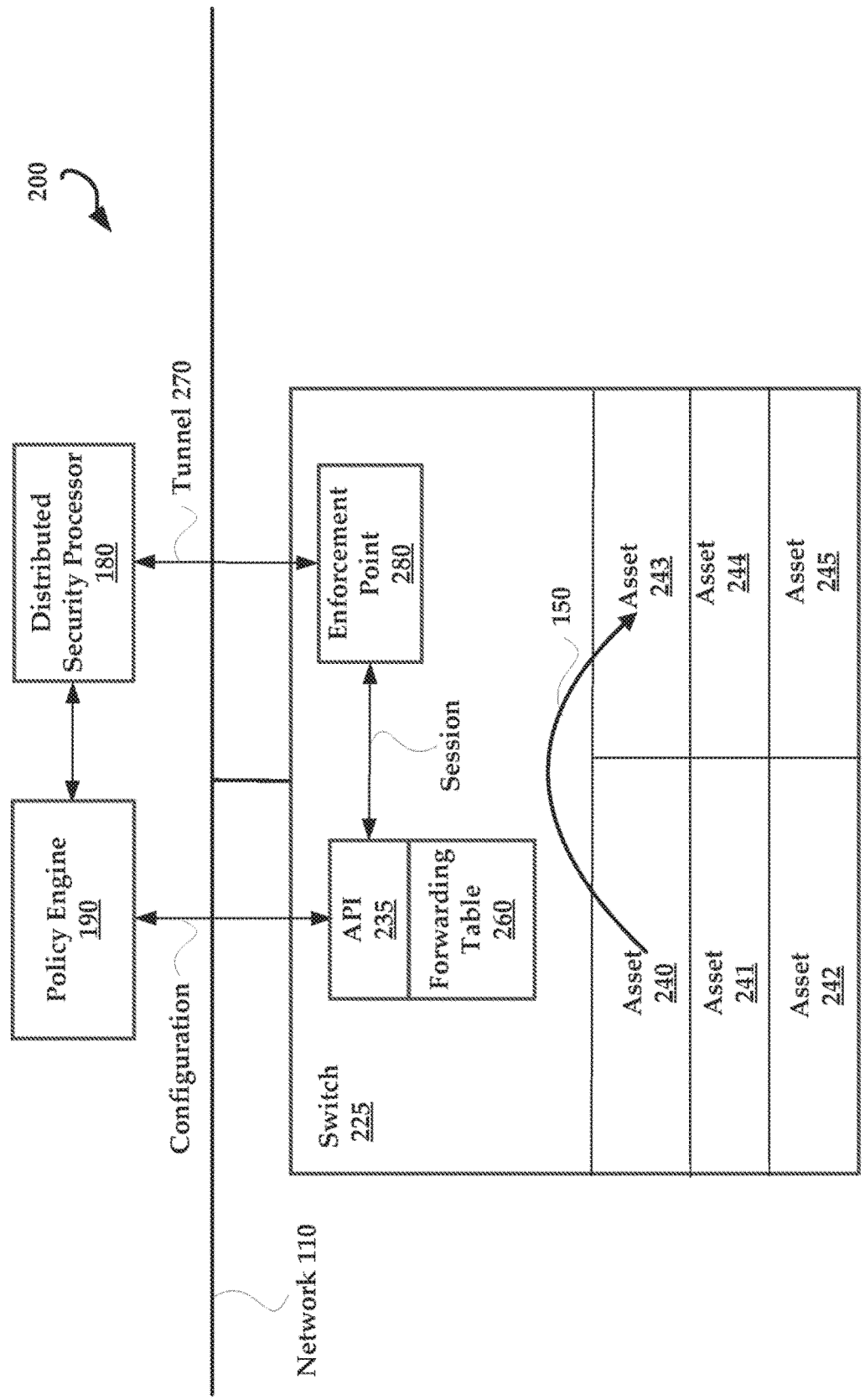

FIG. 4 illustrates an exemplary computer system 400 that may be used to implement some embodiments of the present disclosure. The computer system 400 of FIG. 4 may be implemented in the contexts of the likes of computing systems, networks, servers, or combinations thereof. The computer system 400 of FIG. 4 includes one or more processor unit(s) 410 and main memory 420. Main memory 420 stores, in part, instructions and data for execution by processor unit(s) 410. Main memory 420 stores the executable code when in operation, in this example. The computer system 400 of FIG. 4 further includes a mass data storage 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit(s) 410 and main memory 420 are connected via a local microprocessor bus, and the mass data storage 430, peripheral devices 480, portable storage device 440, and graphics display system 470 are connected via one or more input/output (I/O) buses.

Mass data storage 430, which can be implemented with a magnetic disk drive, solid state drive, or an optical disk drive, is a non-volatile storage device for storing data and instructions for use by processor unit(s) 410. Mass data storage 430 stores the system software for implementing embodiments of the present disclosure for purposes of loading that software into main memory 420.

Portable storage device 440 operates in conjunction with a portable non-volatile storage medium, such as a flash drive, floppy disk, compact disk, digital video disc, or Universal Serial Bus (USB) storage device, to input and output data and code to and from the computer system 400 of FIG. 4. The system software for implementing embodiments of the present disclosure is stored on such a portable medium and input to the computer system 400 via the portable storage device 440.

User input devices 460 can provide a portion of a user interface. User input devices 460 may include one or more microphones, an alphanumeric keypad, such as a keyboard, for inputting alphanumeric and other information, or a pointing device, such as a mouse, a trackball, stylus, or cursor direction keys. User input devices 460 can also include a touchscreen. Additionally, the computer system 400 as shown in FIG. 4 includes output devices 450. Suitable output devices 450 include speakers, printers, network interfaces, and monitors.

Graphics display system 470 includes a liquid crystal display (LCD) or other suitable display device. Graphics display system 470 is configurable to receive textual and graphical information and processes the information for output to the display device.

Peripheral devices 480 may include any type of computer support device that adds additional functionality to the computer system 400.

The components provided in the computer system 400 of FIG. 4 are those typically found in computer systems that may be suitable for use with embodiments of the present disclosure and are intended to represent a broad category of such computer components that are well known in the art. Thus, the computer system 400 of FIG. 4 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that include a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

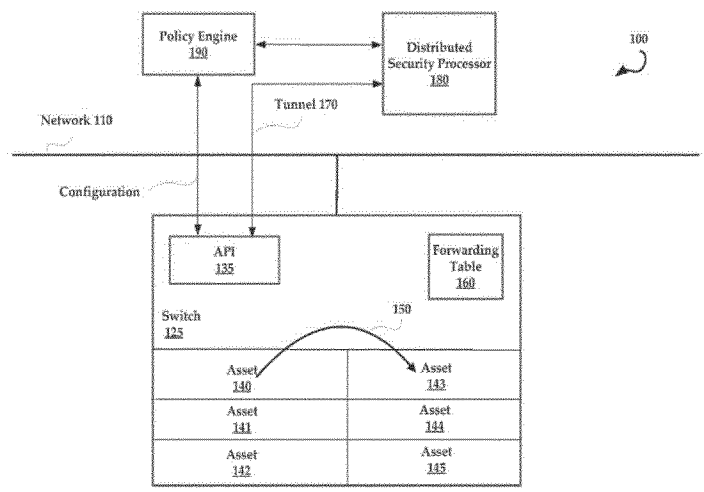

What is claimed is:
1. A method comprising:
 writing, by a policy engine, entries in a forwarding table of a switch through an application programming interface (API) of the switch, such that first data packets from a first host and directed to a second host are forwarded by the switch to an enforcement point;

receiving, by the switch, the first data packets;

forwarding, by the switch, the first data packets to the enforcement point using the forwarding table;

determining, by the enforcement point, whether the first data packets violate a high-level security policy using a low-level rule set;

configuring, by the enforcement point, the forwarding table through the API such that second data packets are forwarded by the switch to the second host, in response to determining the first data packets do not violate the security policy;

configuring, by the enforcement point, the forwarding table through the API such that the second data packets are dropped or forwarded to a security function by the switch, in response to determining the first data packets violate the security policy;

receiving, by the switch, the second data packets; and selectively dropping or forwarding the second data packets, by the switch, in accordance with the configuration.

2. The method of claim 1 further comprising:

receiving, by the enforcement point, a re-compiled rule set from a distributed security processor;

receiving, by the enforcement point, a third data packet;

identifying, by the enforcement point, a trigger in the third data packet, the trigger being at least one of a: received Transmission Control Protocol (TCP) header, flag, and timer-based trigger; and writing, by the enforcement point, entries in the forwarding table through the API, such that fourth data packets from the first host and directed to the second host are forwarded by the switch to the enforcement point, in response to identifying the trigger.

3. The method of claim 2 further comprising:

receiving, by the switch, the fourth data packets;

forwarding, by the switch, the fourth data packets to the enforcement point using the forwarding table; and determining, by the enforcement point, whether the fourth data packets violate the re-compiled rule set or pre-configured protocol behavior requirements.

4. The method of claim 1 wherein at least one of the writing and the configuring of the forwarding table is performed using a software development kit (SDK).

5. The method of claim 1 wherein the security function is at least one of a: honeypot, tarpit, and intrusion detection system.

6. The method of claim 1 wherein at least one of the first host and the second host are a physical host and the switch is a physical switch.

7. The method of claim 1 wherein at least one of the first host and the second host are a virtual machine and the switch is a virtual switch.

* * * * *

UNITED STATES PATENT AND TRADEMARK OFFICE
CERTIFICATE OF CORRECTION

| | |
|---|---|
| PATENT NO. | : 9,973,472 B2 |
| APPLICATION NO. | : 14/677827 |
| DATED | : May 15, 2018 |
| INVENTOR(S) | : Marc Woolward et al. |

It is certified that error appears in the above-identified patent and that said Letters Patent is hereby corrected as shown below:

On the Title Page
Delete the title page and substitute therefor with the attached title page consisting of the corrected illustrative figure.

In the Drawings
Delete drawing sheets 1-2 and substitute therefor the drawing sheets 1-2, consisting of FIGS. 1-2 as shown on the attached pages.

Signed and Sealed this
Thirty-first Day of October, 2023

Katherine Kelly Vidal
*Director of the United States Patent and Trademark Office*

(12) United States Patent
Woolward et al.

(10) Patent No.: US 9,973,472 B2
(45) Date of Patent: May 15, 2018

(54) METHODS AND SYSTEMS FOR ORCHESTRATING PHYSICAL AND VIRTUAL SWITCHES TO ENFORCE SECURITY BOUNDARIES

(71) Applicant: vArmour Networks, Inc., Mountain View, CA (US)

(72) Inventors: Marc Woolward, Bude (GB); Choung-Yaw Shieh, Palo Alto, CA (US)

(73) Assignee: vArmour Networks, Inc., Mountain View, CA (US)

( * ) Notice: Subject to any disclaimer, the term of this patent is extended or adjusted under 35 U.S.C. 154(b) by 92 days.

(21) Appl. No.: 14/677,827

(22) Filed: Apr. 2, 2015

(65) Prior Publication Data
US 2016/0294774 A1  Oct. 6, 2016

(51) Int. Cl.
*H04L 29/06*  (2006.01)

(52) U.S. Cl.
CPC ....... *H04L 63/0236* (2013.01); *H04L 63/0263* (2013.01); *H04L 63/1491* (2013.01); *H04L 63/20* (2013.01)

(58) Field of Classification Search
CPC ................ H04L 63/0236; H04L 63/1491
USPC .............................................. 726/1
See application file for complete search history.

(56) References Cited

U.S. PATENT DOCUMENTS

| | | |
|---|---|---|
| 6,253,321 B1 | 6/2001 | Nikander et al. |
| 6,484,261 B1 | 11/2002 | Wiegel |
| 6,578,076 B1 * | 6/2003 | Putzolu ................ 709/223 |
| 6,765,864 B1 | 7/2004 | Natarajan et al. |
| 6,970,459 B1 | 11/2005 | Meier |
| 6,983,325 B1 | 1/2006 | Watson et al. |
| 6,992,985 B1 | 1/2006 | Das |

(Continued)

FOREIGN PATENT DOCUMENTS

| | | |
|---|---|---|
| TW | 201642616 A | 12/2016 |
| TW | 201642617 A | 12/2016 |

(Continued)

OTHER PUBLICATIONS

Non-Final Office Action, dated Jul. 1, 2015, U.S. Appl. No. 14/673,640, filed Mar. 30, 2015.

(Continued)

*Primary Examiner* — Oleg Korsak
(74) *Attorney, Agent, or Firm* — Carr & Ferrell LLP

(57) ABSTRACT

Some embodiments include methods comprising: writing entries in a forwarding table of a switch through an application programming interface (API) of the switch, such that first data packets from a first host and directed to a second host are forwarded by the switch to an enforcement point; receiving the first data packets; forwarding the first data packets to the enforcement point using the forwarding table; determining whether the first data packets violate a high-level security policy using a low-level rule set; configuring the forwarding table through the API such that second data packets are forwarded by the switch to the second host, in response to determining the first data packets do not violate the security policy; configuring the forwarding table through the API such that the second data packets are dropped or forwarded to a security function by the switch, in response to the determining.

7 Claims, 4 Drawing Sheets